US010225207B2

(12) United States Patent
Steinder et al.

(10) Patent No.: US 10,225,207 B2
(45) Date of Patent: Mar. 5, 2019

(54) MANAGING HYBRID CLOUD PLACEMENT POLICIES

(71) Applicant: International Business Machines Corporation, Armonk, NY (US)

(72) Inventors: Malgorzata Steinder, Leonia, NJ (US); Merve Unuvar, New York, NY (US); Asser N. Tantawi, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 14/467,208

(22) Filed: Aug. 25, 2014

(65) Prior Publication Data

US 2016/0057073 A1 Feb. 25, 2016

(51) Int. Cl.

*G06F 9/455* (2018.01)
*H04L 12/911* (2013.01)
*G06F 8/61* (2018.01)

(52) U.S. Cl.

CPC ................ *H04L 47/72* (2013.01); *G06F 8/61* (2013.01); *G06F 9/45558* (2013.01); *G06F 2009/45562* (2013.01)

(58) Field of Classification Search

CPC ....... H04L 47/72; G06F 9/45558; G06F 8/61; G06F 2009/45562; G06F 9/5072

USPC .......................................................... 709/226

See application file for complete search history.

(56) References Cited

U.S. PATENT DOCUMENTS 6,657,991 B1 * 12/2003 Akgun ................ H04L 12/2801 348/E7.069
9,390,390 B1 * 7/2016 Wertheimer ..... G06Q 10/06313
2012/0023499 A1 * 1/2012 Biran .................... G06F 9/5066 718/103
2012/0102486 A1 * 4/2012 Yendluri .................. G06F 8/60 717/177
2012/0131591 A1 * 5/2012 Moorthi ................. G06Q 10/06 718/104
2012/0254433 A1 10/2012 Gujral et al.
2012/0284408 A1 11/2012 Dutta et al.

(Continued)

FOREIGN PATENT DOCUMENTS

WO 2013109373 A1 7/2013

OTHER PUBLICATIONS

Lorey et al., "Towards Granular Data Placement Strategies for Cloud Platforms", 2010 IEEE International Conference on Granular Computing, pp. 346-351.

(Continued)

*Primary Examiner* — John M Macilwinen
(74) *Attorney, Agent, or Firm* — Alexis N. Hatzis

(57) ABSTRACT

Placing an application on a private portion and a public portion of a hybrid computing environment for processing. An application may be received for placement and processing. A primary processing objective and a split preference of the application may be determined. The split preference indicates whether the application can be processed using one or both of the private portion and the public portion of the hybrid computing environment. The application may be placed on one or both of the private portion and the public portion of the hybrid computing environment for processing, based on the primary processing objective and based on the split preference.

13 Claims, 8 Drawing Sheets

(56) References Cited

U.S. PATENT DOCUMENTS

| | | | | |
|---|---|---|---|---|
| 2013/0061221 A1* | 3/2013 | Anderson | G06F 9/5077 718/1 |
| 2013/0073724 A1* | 3/2013 | Parashar | G06F 9/5072 709/224 |
| 2013/0110923 A1* | 5/2013 | Overton | G06F 9/4446 709/204 |
| 2014/0075183 A1* | 3/2014 | Wang | G06F 19/22 713/150 |
| 2015/0180949 A1* | 6/2015 | Maes | H04L 43/10 709/201 |
| 2015/0327064 A1* | 11/2015 | Chiu | H04W 12/06 455/411 |
| 2015/0378702 A1* | 12/2015 | Govindaraju | G06F 8/61 717/177 |

OTHER PUBLICATIONS

Rahman et al., "Hybrid Resource Provisioning for Clouds", Journal of Physics: Conference Series, vol. 385, 012004, 2012, pp. 1-11.

Araujo et al., "Hybrid Cloud Integration and Monitoring with IBM WebSphere Cast Iron", IBM Corporation, Redbooks, SG24-8016-00, Dec. 2012, pp. 1-204.

Quintero et al., "IBM Technical Computing Clouds", IBM Corporation, Redbooks, SG24-8144-00, Oct. 2013, pp. 1-248.

Bittencourt et al., "HCOC: a cost optimization algorithm for workflow scheduling in hybrid clouds", J. Internet Serv. Appl., SI: Cloud Computing, (2011), vol. 2, pp. 207-227.

Charrada et al., "Approximate placement of service-based applications in hybrid Clouds", 2012 IEEE 21st International WETICE, pp. 161-166.

Karthika et al., "Comparison of Load Balancing and Scheduling Algorithms in Cloud Environment", International Journal of Innovative Technology and Exploring Engineering (IJITEE), ISSN: 2278-3075, vol. 3, Issue 1, Jun. 2013, pp. 164-166.

Mell et al., "The NIST Definition of Cloud Computing", National Institute of Standards and Technology, Information Technology Laboratory, Version 15, Oct. 7, 2009.

Grace Period Disclosure: UNUVAR et al, "Hybrid Cloud Placement Algorithm", IBM Corporation, Mar. 2014.

Bittencourt et al., "Scheduling in Hybrid Clouds," IEEE Communications Magazine, Sep. 2012, p. 42-47.

Chaisiri et al., "Optimal Virtual Machine Placement across Multiple Cloud Providers," IEEE Asia-Pacific Services Computing Conference (IEEE APSCC), 2009, p. 103-110.

Chaisiri et al., "Optimization of Resource Provisioning Cost in Cloud Computing," IEEE Transactions on Services Computing, Apr.-Jun. 2012, p. 164-177, vol. 5, No. 2.

Li et al., "Modeling for Dynamic Cloud Scheduling via Migration of Virtual Machines," Third IEEE International Conference on Coud Computing Technology and Science, 2011, pp. 163-171, IEEE Computer Society.

Lucas Simarro et al., "Dynamic Placement of Virtual Machines for Cost Optimization in Multi-Cloud Environments," IEEE International Conference on High Performance Computing & Simulation, 2011, p. 1-7.

Meng et al., "Improving the Scalability of Data Center Networks with Traffic-aware Virtual Machine Placement," IEEE INFOCOM, 2010, 9 Pages.

Rubinstein et al., "The Cross-Entropy Method: A Unified Approach to Combinatorial Optimization, Monte-Carlo Simulation, and Machine Learning," Information Science and Statistics, 2004, p. 1-300, Springer-Verlag, New York.

Tantawi, "Optimized Cloud Placement of Virtual Clusters Using Biased Importance Sampling," SIGMETRICS'12, Jun. 11-15, 2012, p. 401-402, ACM, London, England, UK.

Tantawi, "A Scalable Algorithm for Placement of Virtual Clusters in Large Data Centers," IEEE 20th International Symposium on Modeling, Analysis and Simulation of Computer and Telecommunication Systems, 2012, p. 3-10, IEEE Computer Society.

Taura et al., "A Heuristic Algorithm for Mapping Communicating Tasks on Heterogeneous Resources," 9th Heterogeneous Computing Workshop Proceedings (HCW 2000), 2000, p. 1-14, IEEE.

Van Den Bossche et al., "Cost-Optimal Scheduling in Hybrid IaaS Clouds for Deadline Constrained Workloads," IEEE 3rd International Conference on Cloud Computing, 2010, p. 228-235, IEEE Computer Society.

* cited by examiner

100
Placement System 102
Hybrid Placement Program 110
Administrative Policy Module 112
Reservation Module 112A
Cost-Weight Module 112B
Utilization Module 112C
Extended Biased Statistical Sampling (EBSS) Module 114
Sampling Module 114A
Biasing Module 114B
Optimizing Module 114C
User 130
User Request 135
Application 136
Private Cloud 118
Architecture 120
PM 124
Public Cloud 116

MANAGING HYBRID CLOUD PLACEMENT POLICIES

STATEMENT REGARDING PRIOR DISCLOSURES BY THE INVENTOR OR A JOINT INVENTOR

The following disclosure is submitted under 35 U.S.C. 102(b)(1)(A): DISCLOSURE: "Hybrid Cloud Placement Algorithm", Merve Unuvar, Malgorzata Steinder, Asser N. Tantawi, Mar. 7, 2014, IEEE MASCOTS, pp. 1-10.

FIELD OF THE INVENTION

The present disclosure generally relates to cloud computing, and more particularly to application placement in a hybrid cloud computing environment.

BACKGROUND

Businesses large and small face a dilemma: build their own IT infrastructure or use a public Infrastructure as a Service ("IaaS") cloud. On premise infrastructure requires an upfront investment and lacks the capability of elastic growth and downsizing, but it offers better visibility and control, security, and performance. Public clouds offer a buy-on-demand model and agility, but leave users with limited control over the infrastructure, security concerns, performance and reliability. How can a business achieve elasticity without the limitations of one-size-fits-all public cloud service? Hybrid cloud combines on premise cloud infrastructure with a public IaaS service. It allows workloads with strict performance, security, or compliance requirements to be hosted in house where there is complete visibility and control of the infrastructure. Workloads that do not have such requirements may be deployed to either the private or public cloud depending on cost and capacity. When the on premise infrastructure is adequately utilized, its cost becomes lower than its public cloud equivalent would be. Elasticity is achieved by allowing workload spikes to be offloaded to a public cloud service thus giving the overall system the appearance of infinite capacity.

BRIEF SUMMARY

A solution to hybrid cloud placement problem may take the above-referenced considerations into account. Unlike prior art, which focuses on placement of individual VMs, embodiments of the present invention take into account the entire application structure and the constraints induced by that structure.

Embodiments of the present disclosure provide a method, system, and computer program product for placing an application on a private portion and a public portion of a hybrid computing environment for processing. The process may include receiving the application and determining a primary processing objective and a split preference of the application. The split preference indicates whether the application can be processed using one or both of the private portion and the public portion of the hybrid computing environment. The process may also include placing the application on one or both of the private portion and the public portion of the hybrid computing environment for processing, based on the primary processing objective and based on the split preference.

DETAILED DESCRIPTION

To provide application deployers with the experience of agility, rapid deployment, and infrastructure transparency, which is expected of a cloud environment, a hybrid cloud solution may automatically select whether a given application should be placed on premise or in a public cloud. Application deployment involves creating a network of infrastructure resources such as virtual machines (VMs), disk volumes, and virtual network elements. Placement decision is thus made for the entire multi-resource application topology. This decision may take into account several considerations: (1) Depending on their role in the application, some of these components may need to be deployed on premise. As an example, a disk volume or a database VM may need to be located behind the business firewall to protect the privacy and integrity of application data. (2) Application deployment across private and public cloud may result in higher communication overhead. Some application components may need to be collocated in the same cloud environment. (3) While private cloud deployment may be considered free, as the cost of infrastructure likely has been paid upfront and cannot be recovered, public cloud deployment is associated with cost of renting cloud resources and the cost of communication between the application components deployed in a private cloud and those deployed in a public cloud. One objective of the placement service may be to minimize the cost of public cloud usage.

Figure 1:
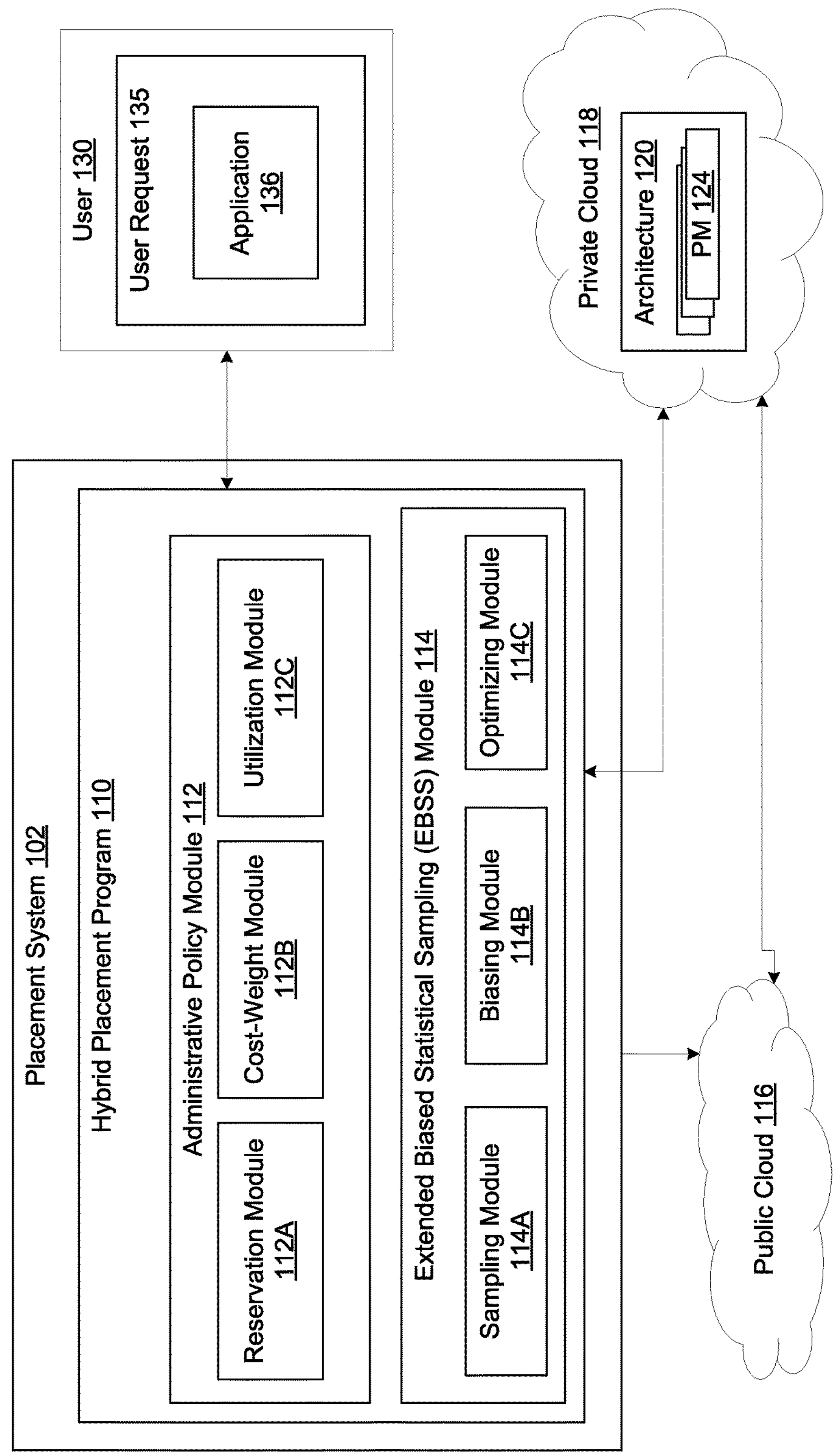
FIG. 1 depicts a hybrid cloud computing environment, according to an embodiment of the invention.

Referring now to FIG. 1, a hybrid cloud environment 100 generally may facilitate hybrid placement of received applications 136 (or workloads) on a private cloud 118 and a public cloud 116 for processing, based on application 136 attributes. Application attributes may define needs, preferences, and requirements for processing the application 136 on private cloud 118 and public cloud 116.

Hybrid placement of applications 136 in hybrid cloud environment 100 may occur via the following components: (i) placement system 102, which generally may facilitate application 136 placement on public cloud 116 and private cloud 118; the public cloud 116 and the private cloud 118 may receive and process all or parts of a received application 136; (ii) private cloud architecture 120 that is part of, or in communication with, private cloud 118, and includes the physical infrastructure that processes a received application 136; private cloud architecture 120 may be transparent to placement system 102 in comparison to the architecture of private cloud 118; and (iv) one or more users 130 that may submit one or more user requests 135 to placement system 102 and its hybrid placement program 110. User request 135 may include an application 136 and additional information about the user request 135 and the application 136, including, for example, attributes or processing requirements of the application 136. Each of these components is described in more detail, below.

User 130 may be a computing device configured to communicate with placement system 102 to submit a user request 135 for processing an application 136. User 130 may also be a natural person in communication with a user 130 device configured to perform these functions. In one example, user 130 may be an IaaS service customer, such as a corporation or business. The corporation may have application and data processing needs relating to, for example, the corporation's payroll and employee healthcare operations. In addition to being a customer of an IaaS service, the corporation may own, lease, control, operate, or otherwise use private computing resources to accommodate such application and data processing needs. The IaaS service, in this example, may correspond to public cloud 116, and the corporation's private computing resources may correspond to private cloud 118.

User request 135 may be a request for processing an application 136. User request 135 and/or application 136 may include associated data, e.g., metadata, that indicate attributes of application 136 and/or user request 135. These attributes may also be referred to as application requirements or request requirements. In an embodiment, user request 135 may include a request for processing of a set of virtual machines (VMs), each of which may have resource demands and pairwise bandwidth demand with other VMs in the request. This set of VMs may be referred to as a pattern. In an embodiment, a pattern may be as follows. Let denote a pattern for a given user request 135 with <CM,D,B,R,Q,S> attributes, where CM denotes a communication bandwidth demand; D denotes a demand for the physical resources such as physical machines (PM) 124; B represents a budget; R represents restrictions due to security constraints; Q denotes a desired quality of service (QoS) level for user 130; and S represents a split preference between public cloud 116 and private cloud 118 for the pattern. Split preference may refer to user's 130 wish that some or all of an application 136 be processed on private cloud 118 for security reasons, so that user 130 may maintain control over application 136 processing and its associated data. This may be the case, for example, where application 136 involves use of regulated data, trade secrets, or other confidential information, that user 130 may wish to keep confidential, or may be unauthorized to transmit to public cloud 116. The reasons for such security may include, without limitation, legal constraints, contractual obligations, preferred business practices, or other reasons. These attributes are described in more detail below, according to an embodiment.

Communication Bandwidth Demand:

Let $n_{vm\rho}$ be the number of VMs in pattern ρ then CM is an $n_{vm\rho}\times n_{vm\rho}$ symmetrical matrix with zeroes in the diagonal. Each entry in the matrix represents the pairwise communication demand between two virtual machines.

Resource Demand:

Let K be the different resource types, then D is a size $n_{vm\rho}\times K$ matrix for the demand of the VMs in pattern ρ for each type of resources.

Budget:

B is the allocated budget for the pattern placement. The budget may be measured in a currency, such as the US dollar.

Restriction for Public Cloud:

R is a size $n_{vm\rho}$ boolean vector that indicates whether each VM in pattern ρ can be deployed to public cloud 116 or not due to security concerns. Let R(j) represent the $j^{th}$ VM in pattern ρ, then:

$$R(j)=\begin{cases}1 & j^{th}\ VM \text{ is restricted from public cloud deployment}\\ 0 & j^{th}\ VM \text{ is allowed for public cloud deploymen}\end{cases}$$

Quality of Service ("QoS"):

Q is the quality of service that user 130 is requesting through the lifetime of its application. It is usually measured by an uninterrupted lifetime. In the examples provided herein, QoS may be used as the probability of acceptance into placement system 102; thus QoS=1−(Rejection Probability).

Split Preference:

S is a boolean variable that indicates the split preference indicated by user 130 for the pattern. If S is set to be 0, then user 130 does not allow an administrator of placement system 102 to split the pattern between two cloud environments while deciding on which cloud to place the pattern. This attribute may override the restriction attribute for some VMs since if one VM in a pattern is restricted from being deployed to public cloud 116, due to split being set to 0, then the entire pattern may be restricted from being deployed to public cloud 116. If S is set to be 1, then user 130 allows administrator to split the pattern. Such preference is not enforced in the placement decision since even though user 130 allows to split the pattern, it may not be feasible to split the pattern for other reasons (e.g., communication between clouds can be very costly or a corresponding VPN connection may not support such communication). Split preference is a useful parameter from a practical perspective. While flexibility to place individual VMs is likely to result in a more optimal solution, many first-time users 130 may be hesitant to allow this much freedom to an automated placement decision process.

Public cloud 116 may be a cloud computing environment that includes one or more cloud computing nodes, as defined and described in greater detail in connection with FIGS. 7-8, below. Generally, public cloud 116 may include physical or virtual computing resources configured to process user-submitted applications 136. Public cloud 116 may receive applications 136 from one or more users 130 via corresponding user request 135. In an embodiment, public cloud's 116 functionality may be available to the users 130 as a service, such as Infrastructure as a Service (IaaS) and may have an associated cost that may be charged to a user 130 account. In various embodiments, the cost of processing an application 136 may be assessed based on its bandwidth usage, resource type usage, number of resources used, or amount of time a resource is used to process the application 136. Other cost measures are possible. Public cloud 116 may be in communication with private cloud 118 to transfer application 136 data as may be required.

Private cloud 118 may be a cloud computing environment that includes one or more cloud computing nodes, as defined and described in greater detail in connection with FIGS. 7-8, below. Generally, private cloud 118 may include physical or virtual computing resources configured to process user-submitted applications 136. Private cloud 118 may receive applications 136 from one or more users 130, as defined in corresponding user requests 135. In an embodiment, private cloud's 118 architecture 120 may be owned, leased, operated, controlled, or otherwise available to users 130, where such access is transparent relative to access to public cloud 116. For example, in an embodiment where user 130 is a business, private cloud architecture 120 may be a set of physical computing devices located at premises owned or operated by the business, or may otherwise be physically accessible by the business. Private cloud 118 may be in communication with public cloud 116.

In private cloud 118, there may be added visibility and control of the infrastructure (e.g., the private cloud architecture 120) relative to public cloud 116. Placement system 102 can discover infrastructure topology and utilization in private cloud 118 and control the placement of VMs (or other virtual resources indicated by a given user request 135) on that infrastructure. Public cloud 116 is opaque—generally, placement system 102 does not know private cloud's 118 topology or utilization, nor can it influence the precise user request 135 placement. A criterion based on which placement system 102 selects private cloud 118 for processing all or parts of user request 135 may be processing cost. In an embodiment, private cloud 118 may be assumed to have infinite capacity, i.e., rejections of user requests 135 deployed to private cloud 118 may almost never be rejected. This assumption has practical justification because capacity-based rejections in typical private clouds 118 are rather uncommon, and when rejections occur, there is often no information available from an operator of private cloud 118 that would allow for rejections to be anticipated and avoided.

Private cloud architecture 120 may include a set of physical and/or virtual resources, which function to receive all or parts of an application 136 submitted by user 130. In an embodiment, the set of physical resources may include physical machines (PMs) 124. In an embodiment, the virtual resources may include virtual machines (VMs). The VMs may be distributed across the PMs.

Placement system 102 may include one or more computing devices in communication with one another, with public cloud 116 and private cloud 118, and with user 130, where a given computing device may include any one of a processor, tangible storage media, a program stored on the tangible storage media, where the program is executable by the processor. A given computing device may be a server, desktop, laptop, mobile device, or any other device as described in greater detail in connection with FIG. 5, below. Placement system 102 may be configured by an administrator. Placement system 102 may receive user requests 135 having corresponding application(s) 136, and distribute application 136 to public cloud 116 and private cloud 118 based on attributes of the user requests 135/application 136.

According to an embodiment, placement system 102 may include a hybrid placement program 110. Hybrid placement program 110 may be a computer program including a set of instructions, which may be organized as program modules, executable by a processor of a computing device, including, for example, placement system 102.

Hybrid placement program 110 may set the parameters of a decision process for placement of user requests 135 and corresponding application 136 on public cloud 116 and private cloud 118 by considering corresponding attributes or requirements, private cloud 118 infrastructure (e.g., private cloud architecture 120) and capacity, and the structure of the connection between public cloud 116 and private cloud 118.

To perform these and additional functions, hybrid placement program 110 may include an administrative policy module 112 and an extended biased statistical sampling (EBSS) module 114. Extended biased statistical sampling (EBSS) module 114 may utilize a sampling module 114A, a biasing module 114B, and an optimizing module 114C to perform such functions. Sampling module 114A may serve as a probabilistic generator of samples or solutions. Where a complete random generation of samples is not efficient due to constraints that may be specified, extended biased statistical sampling (EBSS) module 114 may utilize the biasing module 114B to accomplish a sample favoring a specific bias, for example, a sample favoring a placement based on cost to maintain a specific budget. Optimizing module 114C may serve to evaluate or assess the quality of the solution.

Administrative policy module 112 may generally implement an administrative placement policy via, for example, a reservation module 112A, a cost-weight module 112B, and a utilization module 112C. Administrative policy module 112 may control how much of private cloud 118 capacity should be reserved for user requests 135 which may not be deployed to public cloud 116 and what should be the trade-off between minimizing the deployment cost and user request 135 rejection rate. EBSS module 114 may generally serve to guide placement decisions of placement system 102 by following steps utilizing a sampling module 114A, biasing module 114B, and optimizing module 114C, as described below.

Hybrid placement program 110 processes user requests 135 to deploy applications 136 (or workloads) which arrive according to a stochastic process. Each user request 135 defines the application 136 structure and its requirements or attributes. Hybrid placement program 110 may receive user requests 135 to use a set of physical or virtual resources with pairwise bandwidth requirements. In one embodiment, such resources may be virtual machines (VMs). Once user request 135 is deployed, it may stay in the hybrid cloud environment 100 for a period of time, referred to as its lifetime, after which the user 130 removes the user request 135, and all its resources are released. At the time user request 135 arrives, hybrid placement program 110 may make a placement decision: whether user request 135 or its specific VMs (or other requested physical or virtual resources) should be deployed to public cloud 116 or to private cloud 118, or to a combination thereof. If private cloud 118 is selected for an entire user request 135 or a part thereof, individual physical resources, such as physical machines ("PMs") 124 in the private cloud 118 may be selected to process the application.

Figure 2:
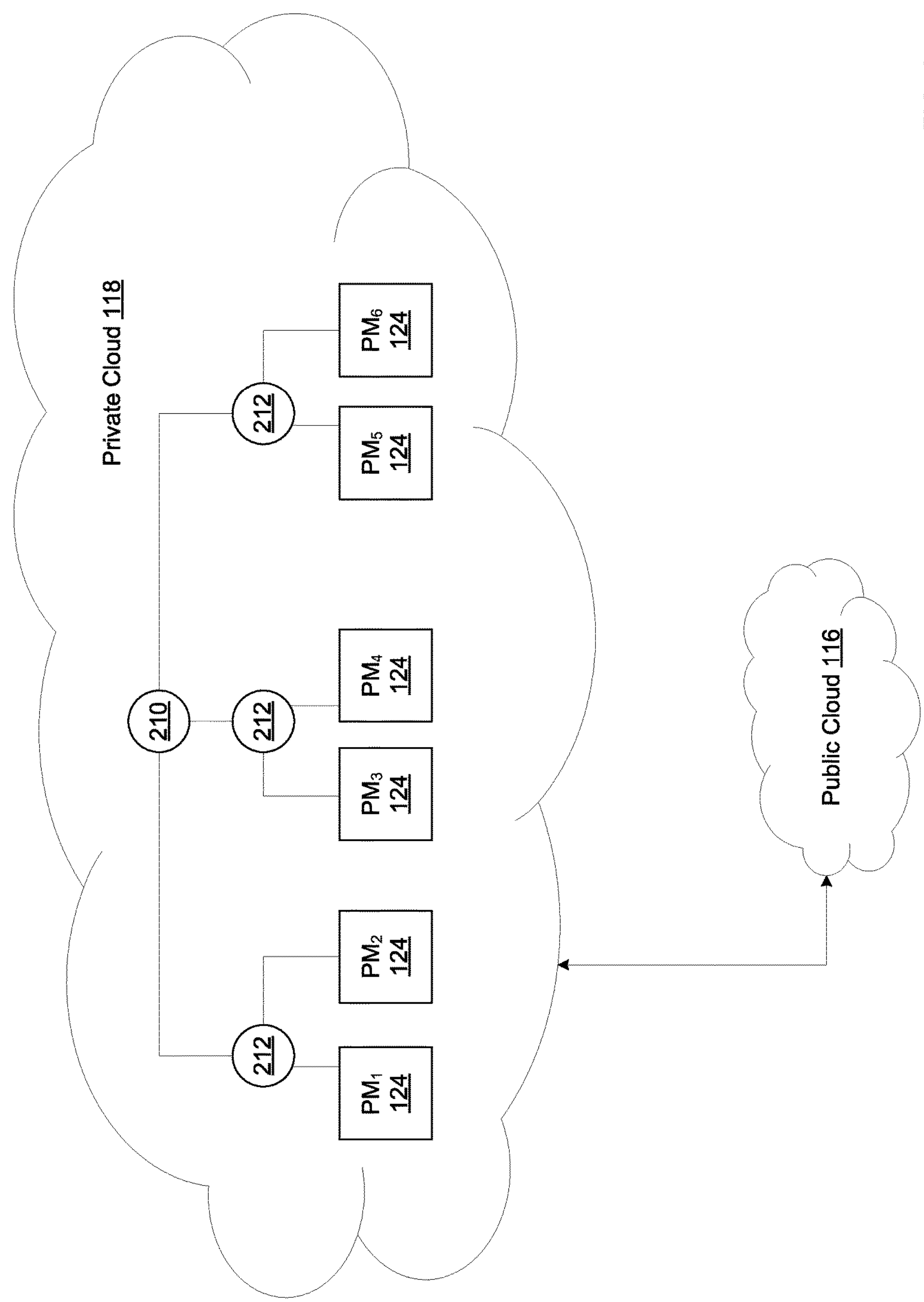
FIG. 2 depicts an exemplary structure of a private cloud environment in communication with a public cloud environment, according to an embodiment of the invention.

FIG. 2 depicts an exemplary embodiment of private cloud architecture 120 shown in FIG. 1. Private cloud 118 includes physical machines (PM) 124 that are connected through switches (SW) via links (LK) to a blade center (BC) 212 which is connected to a rack (RK) 210. The links have capacities, e.g., bandwidth, similar to PM resources such as CPU and memory capacities. In order to select private or public deployment, placement system 102 may consider not only aggregate capacity of private cloud 118, but also resource fragmentation or the lack of network bandwidth. Accordingly, even in the presence of adequate aggregate capacity, a user request 135 may not fit in private cloud 118.

The connection between private cloud 118 and public cloud 116 occurs via an external switch (not shown) with known capacity. Since placement system 102 knows which request components run on which cloud environment, the usage on this external link is also known to placement system 102.

Figure 3:
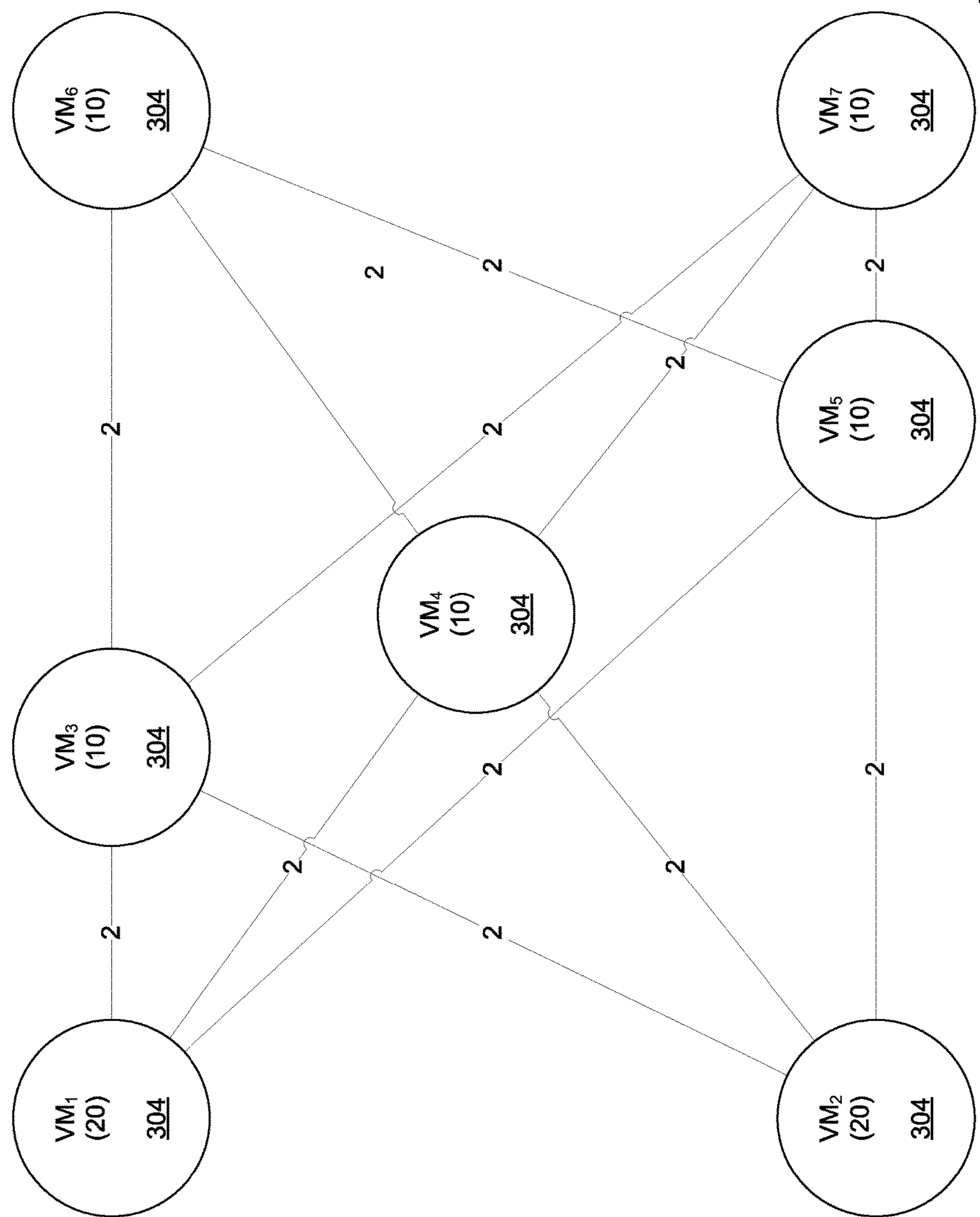
FIG. 3 depicts an application and its corresponding elements, according to an embodiment of the invention.

FIG. 3 depicts an exemplary pattern received by placement system 102 of FIG. 1 via a user request 135, according to an embodiment of the invention. The circles 304 in FIG. 3 denote seven VMs associated with the exemplary user request 135 pattern and the numbers inside the circles denote the CPU demand for each VM. Thus, this particular example includes seven VMs and requires one type of resource demand (in this case, each resource demand corresponds to a demand for a VM). The budget for this pattern may be defined as $6/hour, and only $VM_6$ and $VM_7$ may be restricted for public cloud 116 deployment. The pattern may include a request for 85% QoS, and may allow placement system 102 administrator to split the VMs in the pattern. Such pattern may be represented as:

ρ=<CM,[20,20,10,10,10,10],6,[0,0,0,0,0,1,1],0.85%,1> where the matrix for communication demands is (in Gbps):

$$CM = \begin{bmatrix} 0 & 0 & 2 & 2 & 2 & 0 & 0 \\ 0 & 0 & 2 & 2 & 2 & 0 & 0 \\ 2 & 2 & 0 & 0 & 0 & 2 & 2 \\ 2 & 2 & 0 & 0 & 0 & 2 & 2 \\ 2 & 2 & 0 & 0 & 0 & 2 & 2 \\ 0 & 0 & 2 & 2 & 2 & 0 & 0 \\ 0 & 0 & 2 & 2 & 2 & 0 & 0 \end{bmatrix}$$

Figure 4:
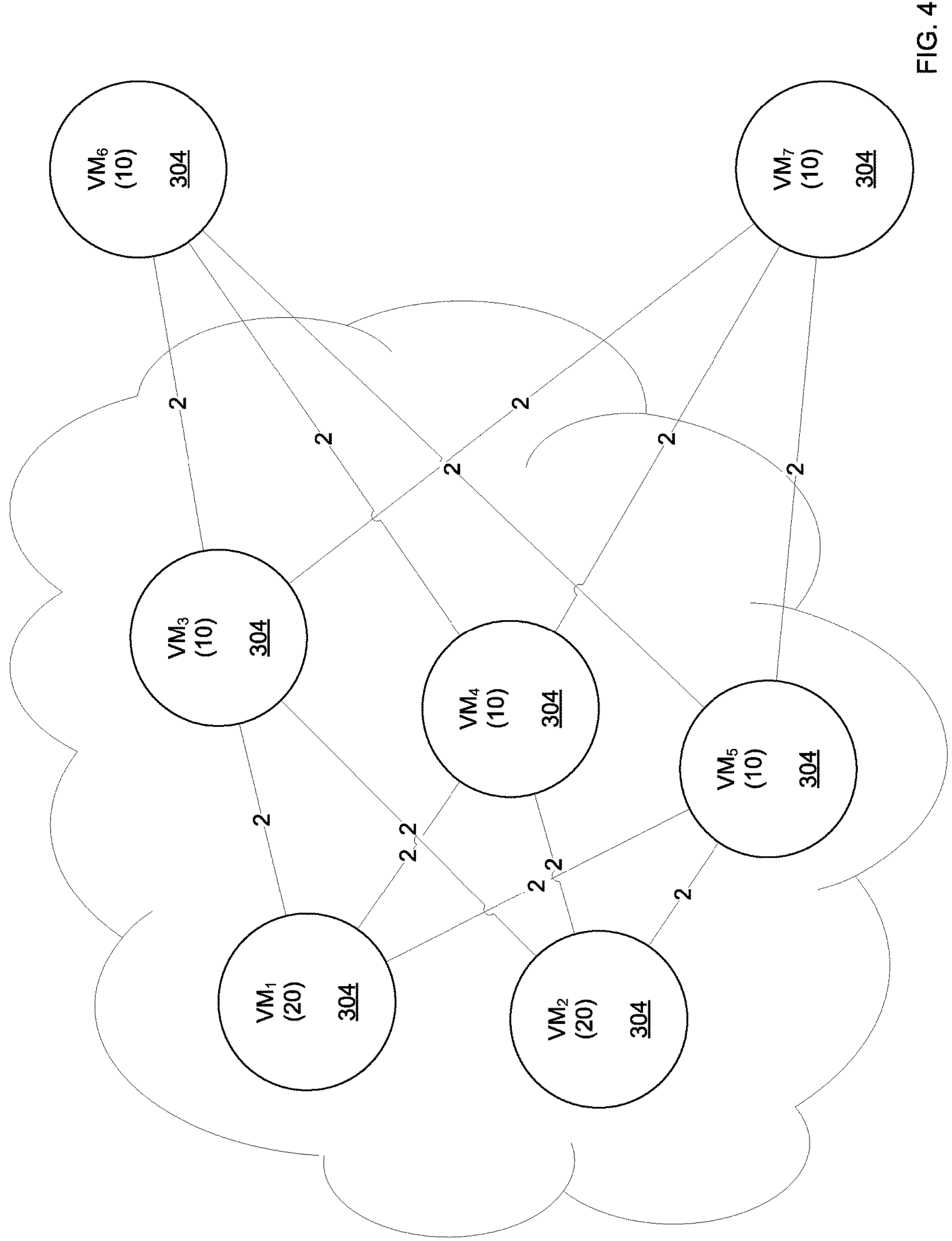
FIG. 4 depicts an exemplary distribution of the application elements depicted FIG. 3 over the hybrid cloud environment of FIG. 1, according to an embodiment of the invention.

FIG. 4 depicts one feasible placement of the exemplary pattern given in FIG. 3, across public cloud 116 and private cloud 118, according to an embodiment of the invention. When placing a VM in a pattern into public cloud 116, user 130 may be required to pay for the usage cost of public cloud's 116 resources, as well as for the communication cost between private cloud 118 and public cloud 116. Private cloud 118 usage may be assumed to be free of charge since private cloud 118 owner pays a fixed fee for private cloud 118 once. Private cloud 118 users, such as user 130, typically do not pay for private cloud 118 usage.

Referring generally to FIGS. 1-4, according to an embodiment, some definitions of concepts, processes, and system components relied upon by placement system 102 and hybrid placement program 110 are provided below.

One factor that may affect hybrid placement program's 110 placement policy may be cost. This policy may be determined and implemented using, for example, cost-weight module 112B of administrative policy module 112. The following discussion of cost focuses primarily on public cloud 116 cost, and private cloud 118 cost is assumed to be zero or constant. It shall be apparent to a person of ordinary skill in the art, however, that the placement decisions described herein with respect to public cloud 116 costs may also be applicable to private cloud 118 costs.

In an embodiment, costs for public cloud 116 may rely on three different public cloud 116 costs:

$C_u$ be defined as a cost of usage per unit. In one example, cost of using public cloud 116 may be based on the size of the instances of application 136 processed on public cloud 116. For example, the charge may be based on instance size as a function of a resource demand, whereby the higher the resource demand is, the higher the cost may be.

$C_{cc}$ may be defined as a cost of a communication unit between public cloud 116 and private cloud 118. For example, the cost may be based on the amount of communication, which may be a function of communication bandwidth demand.

$C_c$ may be defined as a cost of a communication unit within public cloud 116. For example, similar to $C_{cc}$, this cost may be a function of communication bandwidth demand.

For example, the cost of deploying the application 136 or portions of its pattern on public cloud 116, as defined and described in connection with FIGS. 3 and 4, for Cu=0.06$ per unit time public cloud usage and $C_{cc}$=0.12$ per Gbps for a unit of time, may be calculated as follows:

$$((20+20+10+10+10)\times\$0.06)+((2+2+2+2+2+2)\times\$0.12)=\$5.64$$

In order to take the cost attribute fully into account for the placement decision of hybrid placement program 110, the total public cloud 116 placement cost may be calculated as a function of number of unit times that a user request 135 and its corresponding application 136 are going to be using the clouds. In the examples given here, it is assumed that the lifetime of application 136 is not available at the time of arrival. Therefore, placement decisions are made based on the cost rate. However, if lifetime of application 136 is known, this information may be used as well.

In addition to rejection rate and cost effectiveness considerations, hybrid placement program 110 may consider an additional or alternative primary objective for processing application 136: maximizing private cloud 118 utilization. Hybrid placement program 110 may implement the utilization policy via, for example, utilization module 112C of administrative policy module 112. Private cloud 118 utilization may be influenced by the topography of public cloud architecture 120 and the availability of its PMs 124. In an embodiment, these PMs may be an example of a bottleneck resource. A bottleneck resource for private cloud 118 may be defined as the resource in private cloud architecture 120 that reaches to full capacity before other resources do. In other words, the bottleneck resource may be defined as the one that allows minimum number of user requests 135 in placement system 102. For simplicity, but without the loss of generality, in the examples given herein, it is assumed that the bottleneck resource is a physical machine (PM) resource type. It shall be apparent to a person of ordinary skill in the art that the discussion of PM as the bottleneck resource is equally applicable to circumstances were communication bandwidth demand, CM (or any other resource), is the bottleneck resource.

Consider m homogenous PMs 124 in private cloud 118 with K different resources, each having capacity $C_k$, subjected to a stream of patterns with a Poisson arrival process with rate $\lambda_i$ and a generally distributed lifetime with mean $\tau_i$ for pattern i. Let pattern $\epsilon$ have a demand of $D_i^k$ for resource type k. Further, let n represent the total number of different pattern types. Then the total mean offered load for resource k is:

$$\rho_{total}^k = \sum_{i=1}^{n} \lambda_i \tau_i D_i^k \quad \text{(Equation 1)}$$

To calculate the minimum mean offered load for private cloud 118, placement system 102 may take into consideration split preference and private cloud 118 restrictions for user requests 135 defined by user 130. Let the mean private offered load be defined as the load that has to go to private cloud 118 due to restrictions and split preferences. If user 130 does not allow administrator to split the pattern, which means the entire pattern needs to be placed either on private cloud 118 or public cloud 116 only, then a single VM restriction in the pattern restricts the entire pattern from being deployed to public cloud 116. On the other hand, if user 130 allows a split, then the VMs that are restricted from being deployed to public cloud 116 contribute to private cloud 118 load. The mean private demand load along with the relationship between split preference $S_i$, and the restrictions $R_i$, for pattern can be represented as:

$$D^k_{i_{private}} = \left\{(1-S_i)\sum_{j=1}^{n_{vmp}}(\max\{R_i(j)\})D^k_i(j)\right\}+\left\{(S_i)\sum_{j=1}^{n_{vmp}}R_i(j)D^k_i(j)\right\} \quad \text{(Equation 2)}$$

where $D_i^k(j)$ represents the $i^{th}$ pattern's $j^{th}$ VM demand for resource k, and $R_i(j)$ represents the restriction for $j^{th}$ VM in pattern i. The first half of the equation is calculated when $S_i=0$ (split is not allowed), that sums all the VM demands if a single VM has a restriction for public cloud deployment. For example, the sum is 0 if $S_i=0$ and $R_i(j)=0, \forall_j$. Similarly, sum equals to $$\sum_{j=1}^{n_{vmp}} D^k_i(j) \text{ when } Si = 0 \text{ and } \max_j\{R_i(j)\} = 1.$$

The second half of the equation is calculated when $S_i=0$ and $\max_j\{R_i(j)\}=1$. The second half of the equation is calculated when $S_i=1$ (split preference is allowed). This portion of Equation 2 only sums the VMs that have $R_i(j)=1$. The total mean private only demand is found by summing each pattern's private only demand for all patterns as:

$$D^k_{private} = \sum_{i=1}^{n} D^k_{i_{private}} \quad \text{(Equation 3)}$$

Considering the total demand for private cloud 118 to be calculated by Equation 3, then the associated private only mean offered load for resource k is:

$$\rho^k_{private} = \sum_{i=1}^{n} \lambda_i \tau_i D^k_{private} \quad \text{(Equation 4)}$$

In the case where all user requests 135 are restricted from public cloud 116 deployment, may be represented as $\rho_{total}^k=\rho_{private}^k$.

Based on resource demand considerations described above, hybrid placement program 110 may implement a utilization policy via, for example, utilization module 112C of administrative policy module 112. Accordingly, let utilization of resource k in private cloud 118 be defined by $U_k$ such that:

$$U_k = \frac{\rho^{total}_k}{mC_k} \quad \text{(Equation 5)}$$

and let U represent the bottleneck resource utilization. Then $U=\max_k\{U_k\}$ where k that gives the maximum resource utilization is the bottleneck resource. Private cloud 118 can accommodate the total mean offered load $\rho_k^{total}$, $\forall_k$, as long as below condition holds:

$$U \le (1-\epsilon) \quad \text{(Equation 6)}$$

where $(1-\epsilon)$ is the utilization level when request rejections start. As soon as U reaches or exceeds $(1-\epsilon)$, private cloud 118 alone is not sufficient anymore to accommodate the new coming user requests 135. This is when the use of a second cloud, for example, public cloud 116, is considered.

In the case where $U>(1-\epsilon)$, hybrid placement program 110 may process the excess load. Hybrid placement program 110 functions according to the administrative policy module 112, where corresponding parameters are adjusted based on user 130 requirements and state of private cloud 118. User request 135 that has the information about the pattern structure (constraints) and objectives are fed into administrative policy module 112. Administrative policy module 112 observes private cloud's 118 state and sets the correct parameters. The algorithm then makes a placement decision first on which cloud to use; if the decision is to use private cloud 118, the algorithm further makes a decision as to which hosts (e.g., which PMs 124) to use in private cloud 118. Additional details for the administrative policy module 112 and the above referenced parameters are described below.

Based on the above considerations regarding the primary processing objective of a given application 136 and its pattern, administrative policy module 112 may operate according to an administrative policy, $\mathbb{P}_{admin}$, which allows administrator of placement system 102 to tune placement system's 102 behavior based on defined user 130 objectives. As discussed above, according to an exemplary embodiment, these objectives may include: (1) high quality of service (QoS); for example, this may correspond to lower rejection rate for a given pattern; (2) cost reduction; this may be based on the pattern's budget; and (3) maximizing private cloud 118 utilization. These objectives may be defined, in an embodiment, via administrative policy $\mathbb{P}_{admin}$, which may be based, in part, on two components, reservation level RL and cost weight CW, and may be represented as $\mathbb{P}_{admin}$(RL,CW).

Reservation based allocation, RL, is one factor using which can increase priority of one application 136 (or workload) to improve its QoS. This reservation may be set using, for example, reservation module 112A of administrative policy module 112. Reservation is often used to ensure minimum resource allocation to user requests 135 that are particularly hard to accommodate. In one example, hard to accommodate requests may be defined as those with a public placement constraint, i.e., requests with VMs that must be placed in private cloud 118. If these VMs cannot be placed in private cloud 118, the entire request has to be rejected. Unconstrained requests may be assumed not to be rejected unless the budget is exceeded. Hence, if fair treatment of user requests 135 of different types is of a concern to user 130, it makes sense to ensure that constrained requests are entitled to a higher share of private cloud 118 capacity than unconstrained requests. One way to accomplish this is by configuring a resource reservation RL value.

The reservation is considered when Equation 6 does not hold, meaning private cloud 118 capacity is not enough to accommodate total load. Under such circumstances, it may be assumed that $U>(1-\epsilon)$. A private cloud 118 administrator may set the reservation amount to RL when it is desirable to set RL percentage of bottleneck resource capacity to be reserved for user requests 135 with a public cloud 116 constraint. Once the bottleneck resource utilization exceeds (1−RL) %, the private only offered load (calculated using Equation 4) is directed to private cloud 118 while the rest of the load is directed to the public cloud 116 with high acceptance probability. Hence, the utilization of the private cloud 118 bottleneck resource under reservation becomes:

$$U = \max\left\{(1 - RL), \max_k\left\{\frac{\rho_k^{private}}{mC_k}\right\}\right\} \quad \text{(Equation 7)}$$

In an embodiment, the effect of reservation policy on private cloud 118 utilization may be as follows. When mean offered private cloud 118 load for the bottleneck resource is 49% and reservation level is 30%, private cloud 118 utilization may be around 70%, since 49%≤(1−30%). Unconstrained patterns consume 21% of capacity and 30% of capacity may be kept as reserved, should a batch of user requests 135 with the public cloud 116 constraint arrive. On the other hand, when mean offered private load for the bottleneck resource is 86% given the same reservation level, since 86%≥(1−30%), private cloud 118 utilization may be around 86%. This means that in a steady state, only requests with the placement constraint are accepted into private cloud 118 and that they can use private cloud 118 up to its capacity.

Optimizing the reservation level RL may be achieved as follows. Let U* correspond to the utilization level that gives the required rejection rate specified in the QoS component of the request requirements. If the bottleneck resource utilization for private cloud is 118 bounded by U* such that U≤U*, then keeping the utilization below U* ensures the required rejection rate is satisfied. Optimality occurs when U=U* meaning:

$$\max\left\{(1 - RL), \max_k\left\{\frac{\rho_k^{private}}{mC_k}\right\}\right\} = U^* \quad \text{(Equation 8)}$$

Equation 8 can be used to calculate the optimum RL for a given $\rho_k^{private}$.

The reservation level RL can be set on PM 124 resources as well as on links including the link between private cloud 118 and public cloud 116 in a similar way that is explained above. Reservations on network links may be desirable where the links are the bottleneck resource. For instance, if an administrative policy considers reservation only on PM 124 resources while the bottleneck resource is the link capacity between private cloud 118 and public cloud 116, then even though hybrid placement program 110 still reserves space in private cloud 118 and makes a decision as to splitting communicating VMs in a pattern between private cloud 118 and public cloud 116, hybrid placement program 110 may not execute the placement decision. This is because the communication between VMs that are decided to be placed in private cloud 118 and public cloud 116 may not be supported. Therefore, bottleneck resources may be identified to facilitate a desired level of reservations.

The second objective of the administrative policy $\mathbb{P}_{admin}$, defined above, is cost minimization. This may be achieved using a cost weight parameter. Cost weight (CW) may be defined as a coefficient of a cost component in the objective function of the optimization problem. In other words, if CW>0, then the total cost of deployment may be represented in the objective function and the decision made through this objective function may consider the cost optimization. Otherwise, cost optimization might not performed. The higher the coefficient value, the more weight is given to reducing cost. The optimal cost weight adjustment may be done based on user's 130 defined QoS and budget requirements for user request 135 and/or application 136, and its corresponding pattern. Cost weight along with a different reservation level gives a QoS level and an upper limit on the cost of deployment. Based on such combination, placement system 102 administrator may select the most appropriate cost weight along with the reservation level.

Additionally, public cloud 116 restrictions, R, split preference, S of the user request 135, as well as the reservation level, RL, may impact deployment cost. For example, when RL is high, public cloud 116 deployment may start sooner, thereby increasing total cost. Similarly, when an entire pattern is restricted from being deployed to public cloud 116, then nothing is deployed to public cloud 116; cost attributable to public cloud 116 becomes zero. Introducing cost weight as an input in the administrative policy $\mathbb{P}_{admin}$ allows for more flexible controls for the satisfaction of budget and QoS requirements based on pattern types deployed in hybrid placement environment 100.

In achieving user's 130 cost-optimization objectives, hybrid placement program 110 may make a placement decision between private cloud 118 and public cloud 116 at the arrival time of a user request 135, for every VM in a pattern in the corresponding application 136. Further, if the placement decision by hybrid placement program 110 for some VMs or all, results in selecting private cloud 118, a mapping (also referred to as an assignment or a placement) of VMs, that are decided to be placed in private cloud 118, to physical entities (e.g., PMs 124) in private cloud 118 may be generated to facilitate meeting additional requirements specified in user request 135. The mapping may be optimized using an objective function, defined as $F(\mu(\rho))$, where $\mu(\rho)$ is one feasible mapping. The objective function may be a function of: (1) standard deviation of the utilization of PM 124 resources and links to maintain load balancing between them; (2) path length between communicating VMs to ensure communicating VMs are placed close to one another; and (3) cost of deployment to public cloud 116 to achieve cost optimality. Thus, for a given private cloud 118 state, PC, the optimization problem can be formulated as:

$$\mu(\rho)|\min\{F(\mu(\rho))|PC\} \quad \text{(Equation 9)}$$

The individual VM placement, based on only resource requirement version of Model 9 is an instance of bin packing problem (NP-hard). When a group of VMs are considered as an application to be deployed into two clouds, along with communication and other performance related requirements, the problem becomes more complex. In this case, the physical communication links may have virtual bandwidth requirements in addition to performance related requirements. Heuristic optimization techniques may be employed to solve these types of placement problems in a time efficient manner. Integer programming solvers such as CPLEX can also be used to solve Model 9; however they may take orders of magnitude longer to obtain the optimal solution.

In an embodiment, an additional optimization may be performed to achieve the cost-optimization objective for placement of application 136. Biased Importance Sampling (BSA) and cross entropy techniques, to solve Model 9. This approach may be referred to as extended Biased Sampling Algorithm (extended BSA) that is controlled by the administrative policy.

The cloud system model is a representation of the private cloud at a given point in time. The model is built at startup time by learning the physical entities, their attributes, and their interconnections. Then, periodically and/or upon request, the model is updated to reflect the current state of the private cloud. The second cloud system model that represents the public cloud is simply represented by a single infinite capacity node that overrides the resource, communication and QoS constraints. Therefore, public cloud is assumed to satisfy all request resource requirements in the placement logic.

The extended BSA is based on three concepts: (1) sampling, (2) biasing, and (3) improving the sample solutions. Solutions are sampled in a biased way to produce feasible solutions, the best solutions are then evaluated using the optimization objective and then evaluated to iteratively narrow down the search space. Hence the behavior of the algorithm can be influenced by either modifying the optimization objective, changing the biasing function, or both. We use these techniques to extend BSA with goals specific to hybrid cloud placement problem.

Generating Solutions:

Given the complexity of the optimization problem and the large solution space, a sampling technique may be used to generate several potential solutions to the problem. A generator is responsible for the probabilistic generation of samples (or solutions). The generator may use a probability generator matrix where the rows represent the virtual entities in the pattern and the columns represent the physical entities in the clouds, which may be physical machines or the public cloud. (Note that public cloud 116 may be assumed to have unlimited capacity PM). Element p(i,j) in the matrix is the probability that virtual entity r(i) is placed on physical entity s(j). For all values of the sum of i, over j is one since all virtual entities have to be placed on some physical entities. On the first iteration, p(i,j) may be simply chosen based on the availability of resources on the physical entities. On subsequent iterations the matrix is modified to favor the generation of solutions that produced best objective values.

A complete random generation of samples is not efficient due to the constraints that are specified among the virtual entities. Thus, one needs to bias the sampling process and alter those probabilities in such a way that it is more likely to produce a sample that satisfies the constraints.

Biasing the Solution:

A sample is created in series, i.e., r(1) is first placed, then r(2), and so on. Suppose a state where r(1) through r(i−1) are already placed, and hybrid placement program 110 is to decide on the placement of r(i). Instead of using the row p(i,*) in the matrix as is, hybrid placement program 110 may first modify it by applying a number of biasing functions. A number of biasers may be used, one for each type of constraint.

In particular, a location bias $f_{loc}(i,j)$ that may be used can be defined as follows. Let $f_{loc}(i,j)=0$ when s(j) is in public cloud and r(i) is directly or indirectly constrained to be placed in private cloud 118. VM r(i) is directly constrained to be placed in private cloud 118 when R(i)=1. VM r(i) is indirectly constrained to be placed in private cloud 118 when split is not allowed for this user request 135 and one or more previously placed r(1) through r(i−1) is public cloud 116 constrained. Otherwise, $f_{loc}(i,j)$ is set based on bottleneck resource utilization, U and reservation level RL. When U<(1−RL) % then $f_{loc}(i,j)$ is set to a small value for s(j) in public cloud 116 and to a high value for s(j) in private cloud 118 regardless of R(i). When U≥(1−RL) %, then $f_{loc}(i,j)$ is set to a small value for s(j) in private cloud 118 and R(i)=0 and to a high value in all other cases.

In a similar fashion, a budget bias may be defined as $f_{bdgt}(i,j)$ when CW>0 Budget bias function favors placement in such a way to keep cost of deployment within the budget of a given pattern. If the cost of deployment is above the budget, $f_{bdgt}(i,j)$ becomes 0. In other cases, the lower the cost of deployment, the higher the $f_{bdgt}(i,j)$ is. If cost weight is set as 0 by the administrative policy, then $f_{bdgt}(i,j)$ is not calculated hence cost of deployment may exceed required budget.

Add additional bias may be defines as $f_{dem}(i,j)$ and $f_{net}(i,j)$ for resource demand and network communication demand. Then, all bias functions, assuming cost optimization is enforced, are aggregated in a weighted multiplicative form in order to produce a new row as:

$$p'(i,j)=Cf_{dem}(i,j)^{w_{dem}}f_{net}(i,j)^{w_{net}}f_{loc}(i,j)^{w_{loc}}f_{bdgt}(i,j)^{w_{bdgt}}p(i,j) \quad \text{(Equation 10)}$$

where the weights and $w_{dem}$, $w_{net}$, $w_{loc}$, and $w_{bdgt}$ reflect the relative importance of demand, network, location, and budget biasing, respectively, and C is a normalizing constant such that the sum of p'(i,j) over j is one. The sampling of a physical entity s(j) for VM r(i) is then conducted using the biased probability p'(i,j).

Using these biases, demand, network, location and conditional budget biases may be implemented. Therefore, all the user requirements are exposed in algorithm through these bias functions.

Optimizing:

Once a solution is generated, i.e., a mapping of VMs in the pattern to PMs in private cloud 118 or a decision on public cloud 116, hybrid placement program 110 evaluates an objective function to assess the quality of such a solution. Typically, the objective function consists of two parts: a system objective and a user objective. The system objective deals with the impact of the placement on private cloud architecture 120. Depending on the cloud administrator, this impact may be measured, for example, in terms of resource load balancing across private cloud 118 or in terms of power usage, hence favoring load consolidation. The workload objective deals with the satisfaction of user request 135. The user objective measures the quality with which the pattern is placed. For example, this may involve the distance (hop count) between the physical entities that host the workload, the traffic load on the connections among the physical entities, or public cloud 116 cost attained with the given placement.

Improving the Solution:

Hybrid placement program 110 may be executed iteratively, where the quality of generating solutions improves in every iteration. This may be achieved using an importance sampling technique, known as cross-entropy, summarized as follows. First, generate many samples of solutions using a parameterized probability distribution. Then, order the samples in their attained values of the objective function. The top small fraction of samples (important samples), are used to adjust the values of the parameters of the generating probability distribution so as to skew the generation process to yield samples with good objective values. The method iterates a few times until a reasonably good solution is obtained.

Figure 5:
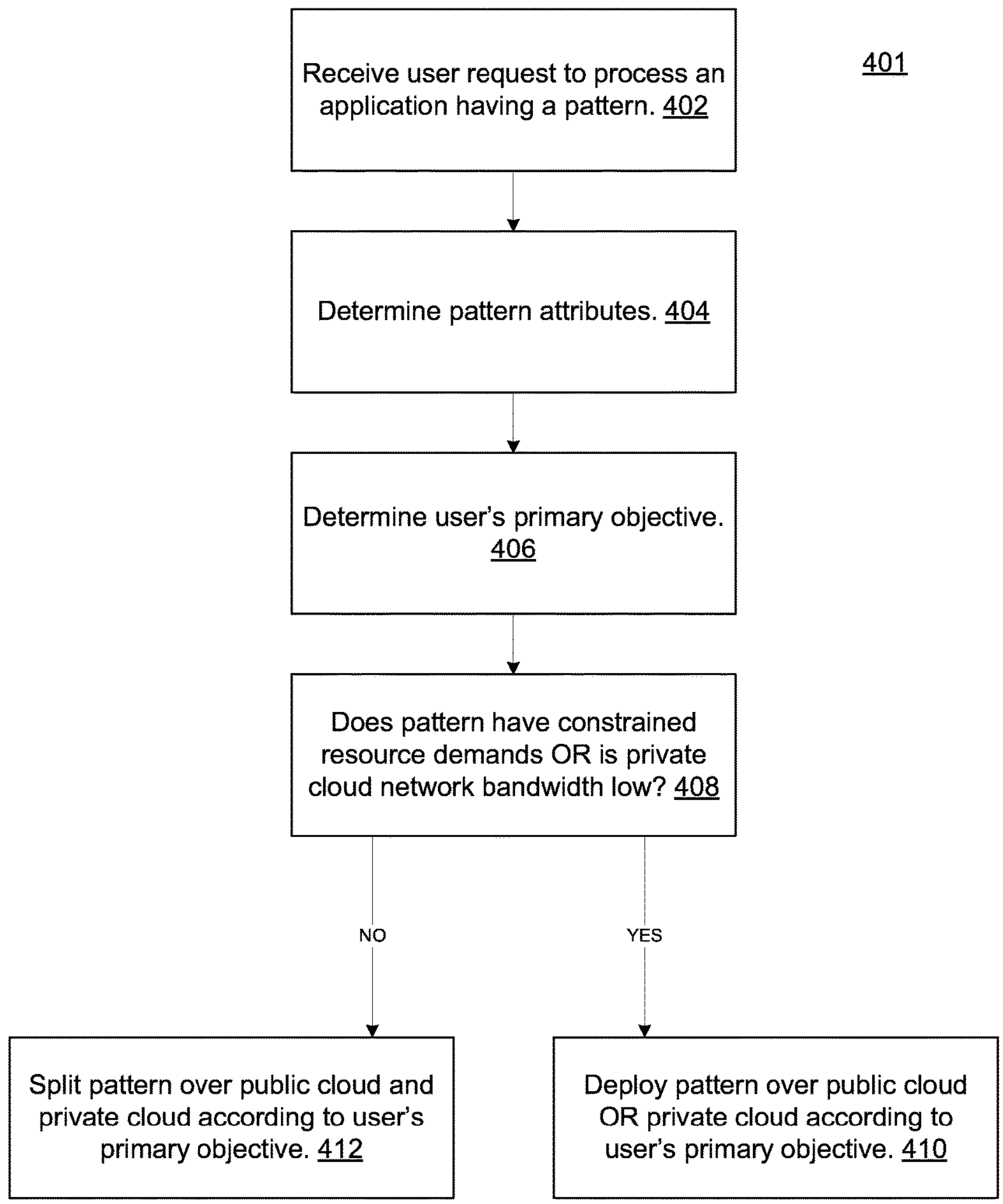
FIG. 5 depicts an exemplary method for placing the application of FIGS. 1-4 on the hybrid cloud computing environment of FIG. 1, according to an embodiment of the invention.

FIG. 5 depicts an exemplary method 401 for placing an application on a private portion and a public potion of a hybrid cloud computing environment for processing. Referring now to FIGS. 1 and 5, steps of method 401 may be performed, for example, by hybrid placement program 110 and its corresponding module, using components of hybrid cloud environment 100.

At step 402, placement system 102 may receive, from user 130, user request 135 containing application 136. Application 136 may include a pattern having attributes as defined, for example, in connection with FIG. 3, above.

At step 404, hybrid placement program 110 may determine the received application's 136 pattern attributes. These may be, for example, <CM,D,B,R,Q,S> attributes of the pattern described in connection with FIG. 3.

At step 406, hybrid placement program 110 may determine the primary processing objectives for processing application 136 and its corresponding pattern. The primary processing objective may be described as part of the pattern's attributes, indicated by a user 130 profile, or through other means. The primary objectives may include one or more objectives as described above in connection with functionality of hybrid placement program 110.

At 406, administrative policy module 112 may determine a corresponding administrative policy based on the determined primary processing objective. For example, if the primary processing objective is minimizing rejection rate of the application 136 and its pattern, administrative policy module 112 and its reservation module 112A may select one or both of public cloud 116 and private cloud 118 for deployment of elements of the pattern (the elements may be, for example, VMs). If private cloud 118 is selected for placement of one or more elements, individual nodes on private cloud 118 (e.g., PMs 124) or other resources thereon, may be reserved by reservation module 112A such that the nodes are available to accept and process the one or more elements.

Similarly, at step 406, administrative policy module 112 and its cost-weight module 112B may select public cloud 118 and/or private cloud 116 based on the pattern's budget. This budget may include public cloud 116 use costs, cost of communication between elements of the pattern within public cloud 116, and cost of communication between the pattern's elements within public cloud 116 with the pattern's elements within private cloud 118.

At step 406, hybrid placement program 110 may use EBSS module 114 to achieve further cost optimization, as described above in connection with FIG. 1.

At step 406, hybrid placement program 110 may determine that the primary processing objective for application 136 is maximizing private cloud 118 utilization. Accordingly, administrative policy module 112 and its utilization module 112C may select public cloud 116 and/or private cloud 118, and specific nodes or resources (e.g., PMs 124) within private cloud 118, for processing application's 136 pattern, with the goal of maximizing private cloud 118 utilization.

At step 408, hybrid placement program 110 may determine whether application's 136 pattern includes any constraints (a constraint may exist, for example, where a given VM in the pattern is indicated as having a public cloud 118 constraint, meaning that the VM must be processed on private cloud 118). Hybrid placement program 110 may alternatively determine whether private cloud's 118 internal network bandwidth is low. Since private cloud 118 and its architecture 120 is relatively transparent to hybrid placement program 110, as described above in connection with FIGS. 1 and 2, hybrid placement program 110 may assess the typography and a current state of private cloud 118 and its architecture 120 to make these determinations.

If either of the above scenarios is true (YES branch of step 408), hybrid placement program 110 deploys, at step 410, elements of application's 136 pattern to public cloud 116 or private cloud 118, as determined by administrative policy module 112. This may be the case where the pattern cannot be split. The prohibition against splitting may be determined by hybrid placement program 110 and administrative policy module 112 based on constraints and preferences indicated by attributes of the pattern. Therefore, if a split is not permitted, or if a constraint prevents an otherwise allowable split, hybrid placement program 110 selects either private cloud 118 or public cloud 116, based on the defined primary processing objective for application 136.

If neither of the above scenarios is true (NO brank of step 408), hybrid placement program 110 and administrative policy module 112 split, at step 412, elements of application's 136 pattern between public cloud 116 and private cloud 118, as may be necessary, influenced by the primary processing objective for application 136. Therefore, at step 412, both clouds may be used, but this need not be the case. The cloud selection, as well as node selection within private cloud 118 (if private cloud 118 is selected), is guided by the primary processing objective for application 136 and its pattern.

Figure 6:
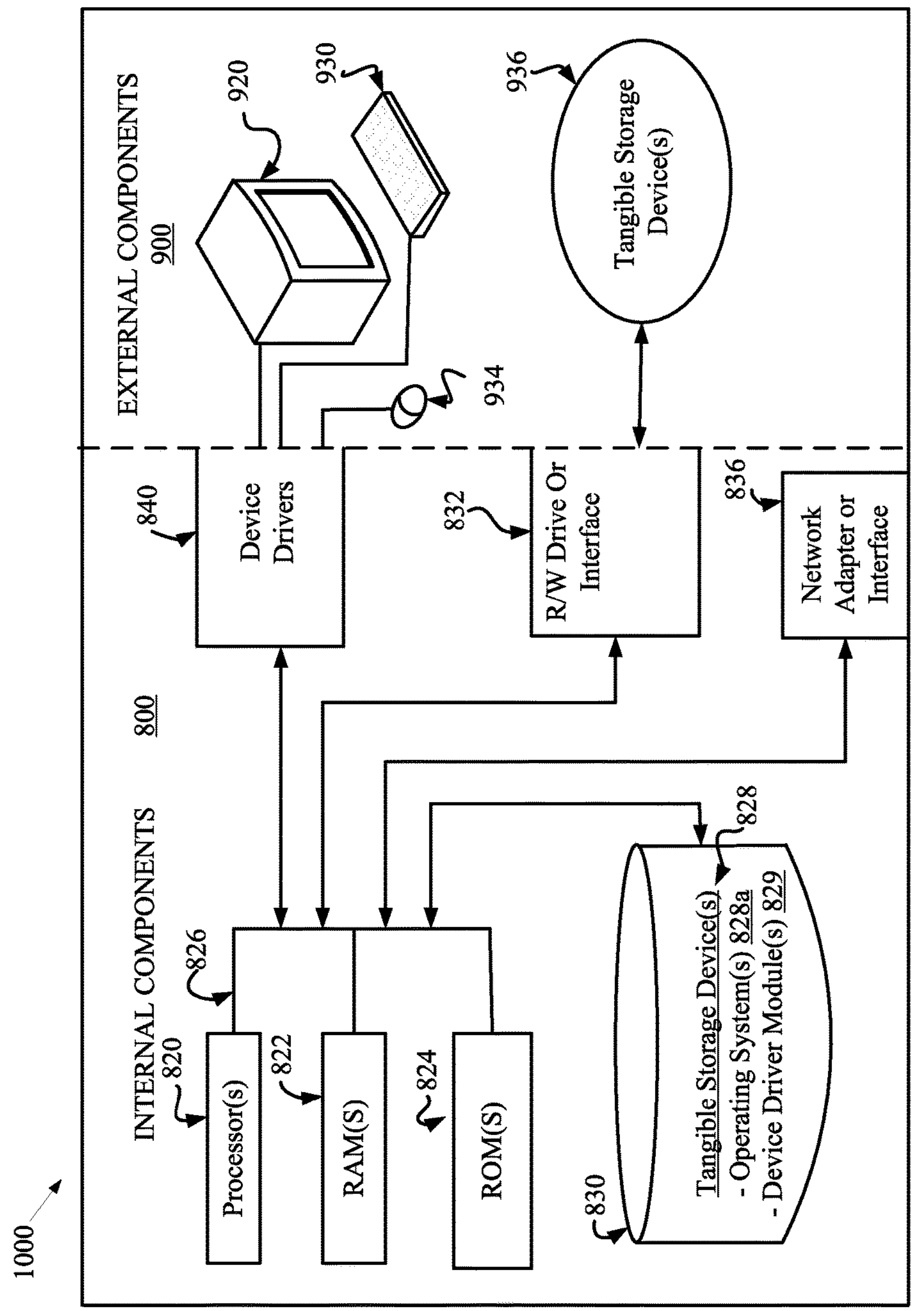
FIG. 6 depicts an exemplary computing device, according to an embodiment of the invention.

Referring now to FIG. 6, a computing device 1000 may include respective sets of internal components 800 and external components 900. The computing device 1000 may be or may include, for example, placement system 102, a user 130 device, nodes of public cloud 116 or private cloud 118 (e.g., PMs 124), which are depicted in FIG. 1, as well as in FIGS. 2-4. Each of the sets of internal components 800 includes one or more processors 820; one or more computer-readable RAMs 822; one or more computer-readable ROMs 824 on one or more buses 826; one or more operating systems 828; one or more software applications **828*a* (e.g., device driver modules) executing hybrid placement program 110 (FIG. 1); and one or more computer-readable tangible storage devices 830. The one or more operating systems 828 and device driver modules 829 are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824**, EPROM, flash memory or any other computer-readable tangible storage device that can store a computer program and digital information.

Each set of internal components 800 also includes a R/W drive or interface 832 to read from and write to one or more computer-readable tangible storage devices 936 such as a thin provisioning storage device, CD-ROM, DVD, SSD, memory stick, magnetic tape, magnetic disk, optical disk or semiconductor storage device. The R/W drive or interface 832 may be used to load the device driver 840 firmware, software, or microcode to tangible storage device 936 to facilitate communication with components of computing device 1000.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 1000, can be downloaded to computing device 1000 from an external computer (e.g., server) via a network (for example, the Internet, a local area network or wide area network) and respective network adapters or interfaces 836. From the network adapters (or switch port adapters) or interfaces 836 and operating system 828 associated with computing device 1000 are loaded into the respective hard drive 830 and network adapter or interface 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Figure 7:
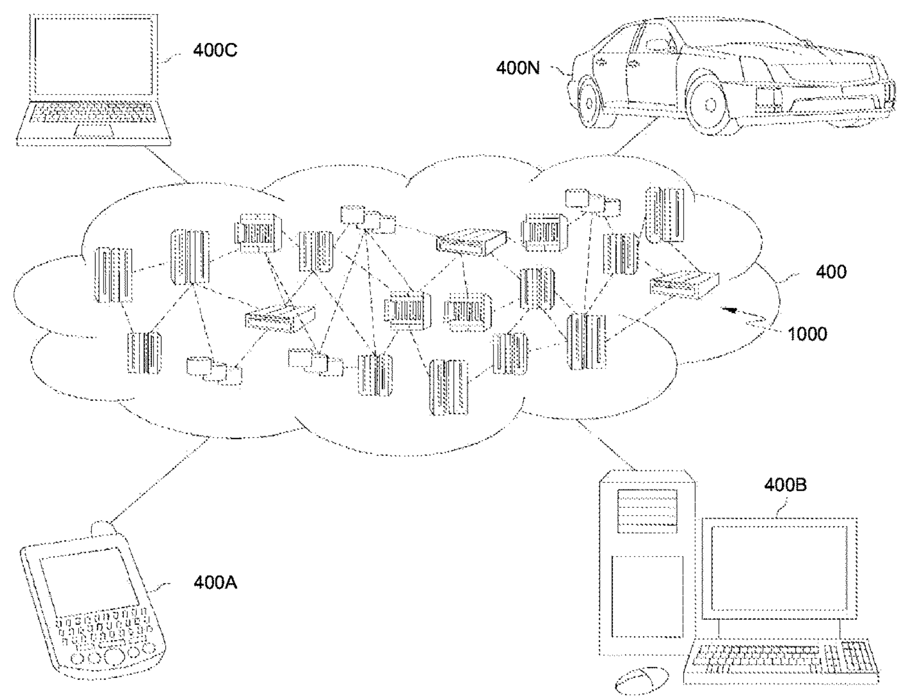
FIG. 7 depicts an exemplary cloud computing environment, according to an embodiment of the invention.

Referring now to FIG. 7, an illustrative cloud computing environment 400 is depicted. Cloud computing environment 400 may include, for example, the hybrid cloud environment 100 of FIG. 1. As shown, the cloud computing environment 400 comprises one or more cloud computing nodes, each of which may be computing device 1000 (FIG. 6) with which local computing devices used by cloud consumers, such as, for example, a personal digital assistant (PDA) or a cellular telephone 400A, a desktop computer 400B, a laptop computer 400C, and/or an automobile computer system 400N, may communicate. The nodes 1000 may communicate with one another. They may be grouped (not shown) physically or virtually, in one or more networks, such as Private, Community, Public, or Hybrid clouds as described hereinabove, or a combination thereof. This allows the cloud computing environment 400 to offer infrastructure, platforms and/or software as services for which a cloud consumer does not need to maintain resources on a local computing device. It is understood that the types of computing devices 400A-N shown in FIG. 7 are intended to be illustrative only and that the computing nodes 1000 and the cloud computing environment 400 can communicate with any type of computerized device over any type of network and/or network addressable connection (e.g., using a web browser).

Figure 8:
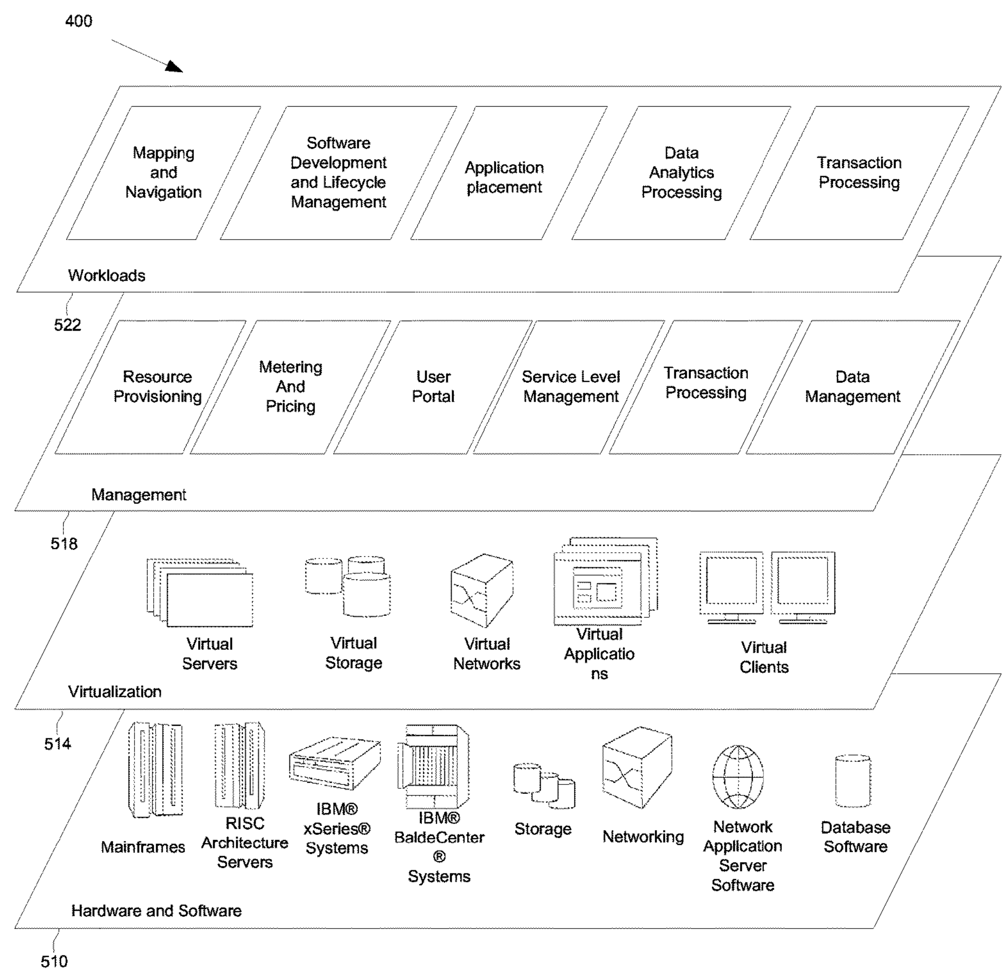
FIG. 8 depicts functional work layers of the exemplary cloud computing environment of FIG. 7, according to an embodiment of the invention.

Referring now to FIG. 8, a set of functional abstraction layers provided by the cloud computing environment 400 (FIG. 7) is shown. It should be understood in advance that the components, layers, and functions shown in FIG. 8 are intended to be illustrative only and embodiments of the invention are not limited thereto. As depicted, the following layers and corresponding functions are provided.

The hardware and software layer 510 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer 514 provides an abstraction layer from which the following examples of virtual entities may be provided: virtual servers; virtual storage; virtual networks, including virtual private networks; virtual applications and operating systems; and virtual clients.

In one example, the management layer 518 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 522 provides examples of functionality for which the cloud computing environment may be utilized. Examples of workloads and functions which may be provided from this layer include: mapping and navigation; software development and lifecycle management; virtual classroom education delivery; data analytics processing; transaction processing; and placing an application on a private portion and a public portion of the cloud computing environment (FIGS. 1-5).

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps.

Furthermore, steps of the method may be performed in parallel to perform their described functionality.

What is claimed is:

1. A method for deploying an application on a private portion and a public portion of a hybrid computing environment for processing, comprising:

receiving the application, wherein the application includes a pattern, the pattern comprising a set of virtual machines;

determining a primary processing objective and a set of user-defined constraints for processing the application, wherein the primary processing objective is minimizing a user request rejection rate, wherein the set of user-defined constraints includes a split preference of the application, the split preference indicating that the application can be processed using the public portion of the hybrid computing environment, wherein the split preference indicated for the pattern is a boolean variable, and wherein the split preference of 0 indicates that the pattern may be processed using the private portion or the public portion of the hybrid computing environment and the split preference of 1 indicates that the pattern may be processed using both the private portion and the public portion of the hybrid computing environment, wherein the split preference of 0 indicated for the pattern overrides any existing restriction attribute and restricts the pattern from being deployed to the private portion of the hybrid computing environment; and deploying the application on the public portion of the hybrid computing environment for processing, based on the primary processing objective and the set of user-defined constraints.

2. The method of claim 1, wherein the split preference requires that elements of the application be processed by either the public portion or by the private portion of the hybrid computing environment.

3. The method of claim 1, wherein one or more elements of the application are constrained elements requiring the constrained elements to be processed by the private portion of the hybrid computing environment.

4. The method of claim 1, wherein the primary processing objective includes minimizing the rejection rate for processing the application, and the method further comprises:

selecting a set of processing nodes of one or both of the private portion and the public portion of the hybrid computing environment for processing of the application, according to a reservation policy.

5. The method of claim 1, wherein the primary processing objective includes minimizing the cost factor associated with processing the application, and the method further comprises:

selecting a set of processing nodes of one or both of the private portion and the public portion of the hybrid computing environment for processing of the application, based on an extended biased sampling algorithm.

6. The method of claim 1, wherein the primary processing objective includes maximizing utilization of the private portion of the hybrid computing environment, and the method further comprises:

selecting a set of processing nodes of one or both of the private portion and the public portion of the hybrid computing environment for processing of the application, based on a private portion placement policy.

7. A computer system for deploying an application on a private portion and a public portion of a hybrid computing environment for processing, comprising:

a computer device having a processor and a tangible storage device; and a program embodied on the storage device for execution by the processor, the program having a plurality of program instructions for execution by the processor, the program instructions including instructions for:

receiving the application, wherein the application includes a pattern, the pattern comprising a set of virtual machines;

determining a primary processing objective and a set of user-defined constraints for processing the application, wherein the primary processing objective is minimizing a user request rejection rate, wherein the set of user-defined constraints includes a split preference of the application, the split preference indicating that the application can be processed using the public portion of the hybrid computing environment, wherein the split preference indicated for the pattern is a boolean variable, and wherein the split preference of 0 indicates that the pattern may be processed using the private portion or the public portion of the hybrid computing environment and the split preference of 1 indicates that the pattern may be processed using both the private portion and the public portion of the hybrid computing environment, wherein the split preference of 0 indicated for the pattern overrides any existing restriction attribute and restricts the pattern from being deployed to the private portion of the hybrid computing environment; and deploying the application on the public portion of the hybrid computing environment for processing, based on the primary processing objective and the set of user-defined constraints.

8. The system of claim 7, wherein the primary processing objective of the application includes at least one of:

minimizing a rejection rate for processing the application;

minimizing a cost factor associated with processing the application; and maximizing utilization of the private portion of the hybrid computing environment.

9. The system of claim 7, wherein the split preference requires that elements of the application be processed by either the public portion or the private portion of the hybrid computing environment.

10. The system of claim 8, wherein the primary processing objective includes minimizing the rejection rate for processing the application, and the program instructions further comprise instructions for:

selecting a set of processing nodes of one or both of the private portion and the public portion of the hybrid computing environment for processing of the application, according to a reservation policy.

11. The system of claim 8, wherein the primary processing objective includes minimizing the cost factor associated with processing the application, and the program instructions further comprise instructions for:

selecting a set of processing nodes of one or both of the private portion and the public portion of the hybrid computing environment for processing of the application, based on an extended biased sampling algorithm.

12. The system of claim 8, wherein the primary processing objective includes maximizing utilization of the private portion of the hybrid computing environment, and the program instructions further comprise instructions for:

selecting a set of processing nodes of one or both of the private portion and the public portion of the hybrid computing environment for processing of the application, based on a private portion placement policy.

13. A computer program product for deploying an application on a private portion and a public portion of a hybrid computing environment for processing, comprising a tangible storage device having program code embodied therewith, the program code executable by a processor of a computer to perform a method comprising:

receiving the application, by the processor, wherein the application includes a pattern, the pattern comprising a set of virtual machines;

determining, by the processor, a primary processing objective and a set of user-defined constraints for processing the application, wherein the primary processing objective is minimizing a user request rejection rate, wherein the set of user-defined constraints includes a split preference of the application, the split preference indicating that the application can be processed using the public portion of the hybrid computing environment; and wherein the split preference indicated for the pattern is a boolean variable, and wherein the split preference of 0 indicates that the pattern may be processed using the private portion or the public portion of the hybrid computing environment and the split preference of 1 indicates that the pattern may be processed using both the private portion and the public portion of the hybrid computing environment, wherein the split preference of 0 indicated for the pattern overrides any existing restriction attribute and restricts the pattern from being deployed to the private portion of the hybrid computing environment; and deploying the application, by the processor, on the public portion of the hybrid computing environment for processing, based on the primary processing objective and the set of user-defined constraints.

* * * * *